United States Patent
Fischer

(10) Patent No.: US 6,661,892 B1
(45) Date of Patent: Dec. 9, 2003

(54) METHOD AND APPARATUS FOR DECREASING DISTORTION IN A LINE POWERED MODULATOR CIRCUIT

(75) Inventor: Jonathan Herman Fischer, Blandon, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/280,473

(22) Filed: Mar. 30, 1999

(51) Int. Cl.$^7$ .................................................. H04M 1/00
(52) U.S. Cl. ........................................ 379/391; 379/412
(58) Field of Search ............................. 379/387.01, 391, 379/402, 404, 412, 93.01

(56) References Cited

U.S. PATENT DOCUMENTS

| | | | | |
|---|---|---|---|---|
| 4,358,645 A | * | 11/1982 | Brown | 379/345 |
| 5,636,273 A | * | 6/1997 | Schopfer et al. | 379/412 |
| 5,640,451 A | * | 6/1997 | Schopfer | 379/412 |
| 5,809,109 A | * | 9/1998 | Moyal et al. | 379/412 |
| 6,298,037 B1 | * | 10/2001 | Sharifi | 370/210 |

OTHER PUBLICATIONS

U.S. patent application Ser. No. 09/028,061, Hollenbach et al., filed Feb. 23, 1998.

U.S. patent application Ser. No. 09/055,991, Hollenbach et al., filed Apr. 7, 1998.

* cited by examiner

*Primary Examiner*—Minsun Oh Harvey
*Assistant Examiner*—Jeffrey Harold
(74) *Attorney, Agent, or Firm*—Synnestvedt & Lechner LLP

(57) ABSTRACT

A method and apparatus for a telephone line interface or data access arrangement (DAA) which includes a shunt regulator in series with a line modulator. A first sense resistor is placed in series between the shunt regulator and the line modulator to provide a measurement of the amount of current distortion in the DAA shunt regulator. The voltage across the first sense resistor is fed back to the line modulator. A second sense resistor is inserted into the line modulator circuitry to provide a measurement of the system current distortion that is outside of the path containing the sense resistor used to monitor the current distortion in the DAA shunt regulator. The voltage across the second sense resistor is also fed back to the line modulator. The line modulator is capable of adjusting the AC modulation and the DC termination presented to the telephone line. The method includes drawing power from the telephone line using a shunt regulator, modulating the telephone line in series with the shunt regulator, sensing a level of distortion in the shunt regulator, sensing a level of distortion outside the shunt regulator, and feeding the sensed levels of distortion to the line modulator.

21 Claims, 4 Drawing Sheets

METHOD AND APPARATUS FOR DECREASING DISTORTION IN A LINE POWERED MODULATOR CIRCUIT

FIELD OF THE INVENTION

This invention relates to a low noise telephone line interface for data access arrangements (DAA). Specifically, it relates to a line powered DAA having significantly improved linearity and accuracy over the prior art.

BACKGROUND OF THE INVENTION

The telephone lines to a residence in the United States and elsewhere can have common mode voltages of over 100V, and the FCC requires the telephone lines to be isolated from any electric main powered device (such as a PC) connected to the telephone lines (through a modem for example) to prevent damage to the telephone network. 47 CFR 68.302,4 (10-1-97 Edition). A data access arrangement (DAA) is specified by the FCC to isolate the telephone lines from electric main powered devices, such as illustrated in FIG. 3. Id. Since the voice band modem signal is limited to the 100 to 3600 Hz band, a DAA can be constructed using a transformer which operates as a bandpass filter to isolate the electric main powered device from the telephone lines.

A smaller size and potentially lower cost solution uses active circuits to communicate with the central telephone office and various modulation techniques to couple the DAA through small capacitors to the PC.

FIG. 4 shows a known line powered telephone line interface circuit for modulating a data signal onto a telephone line using active circuits. The circuit is disclosed and described fully in U.S. patent application Ser. No. 09/028,061 filed on Feb. 26, 1998, entitled Low Noise Line Powered DAA With Feedback, assigned to the same assignee as the present application, and is incorporated herein by reference. The circuit is designed in low voltage CMOS technology and can handle only a small amount of voltage. The main function of the circuit is to take the incoming current, $I_{LINE}$, supplied by the telephone company and modulate it with a data signal developed by processing a differential data signal source, $V_D$, with a line modulator so as to place the data signal on the telephone line. The prior art circuit uses transistor $Q_1$ as a line modulator, and contains a shunt regulator in series with the line modulator $Q_1$. A sense resistor $R_{S1}$ is placed in series between the line modulator $Q_1$ and the shunt regulator to monitor the current through the shunt regulator.

The prior art circuit depicted in FIG. 4 works by monitoring the current through sense resistor $R_{S1}$ with a feedback loop around the amplifier A. Resistors $R_{T1}$ and $R_{B1}$ sense the differential voltage across $R_{S1}$. By setting $R_{T1}=R_{B1}$, the current through $R_{T1}$ and $R_{B1}$ will accurately model the current through $R_{S1}$. The desired signal to be modulated is introduced by a differential signal source $V_D$. The differential signal is created by adding signal $V_D/2$ to $V_{CM}$ to create $V_P$ and subtracting $V_D/2$ from $V_{CM}$ to create $V_N$. This differential signal then drives the input resistors $R_{IP}$ and $R_{IN}$ to provide a differential signal input current. The generation of the differential signal current is well known in prior art and will not be further discussed herein. The control amplifier operates to force the current through resistor $R_{S1}$ to equal the desired signal current by regulating transistor $Q_2$ to control the base of transistor $Q_1$, which in turn regulates the current through the source-emitter path of transistor $Q_1$ and thereby through resistor $R_{S1}$. In this circuit, the collector current of transistor $Q_1$ is well controlled by the control amplifier A. However, this arrangement incurs a degree of error which is problematic for new communication devices such as high speed data modems.

Ideally, the current through $R_{S1}$ would equal the current, $I_{LINE}$, introduced to the system by the telephone company. An error exists in the prior art line modulation device of FIG. 4 due to the inclusion of only part of the total current $I_{LINE}$ in $R_{S1}$. The current from the telephone company is introduced to the system through the emitter of transistor $Q_1$ (hereinafter "$I_{E1}$"). In the prior art circuit depicted in FIG. 4, $I_{E1}$ is equal to $I_{LINE}$, the resistances of $R_{T1}$ and $R_{B1}$ are a couple hundred thousand ohms, and the resistance of $R_{S1}$ is 10–20 ohms. Because of the relatively high level of resistance of $R_{T1}$ and $R_{B1}$, the current that flows through $R_{T1}$ and $R_{B1}$ can be neglected in the circuit analysis. As current flows through the circuit, $I_{E1}$ is divided into the transistor $Q_1$ base current (hereinafter "$I_{B1}$") and the transistor $Q_1$ collector current (hereinafter "$I_{C1}$"). The collector current $I_{C1}$ through the resistor $R_{S1}$ is used by amplifier A in a feedback loop to modulate the desired signal onto $I_{LINE}$. Since the current $I_{B1}$ is outside the feedback loop, an error term in the amount of $I_{B1}$ is introduced to the circuit, that is, $I_{C1}$ through resistor $R_{S1}$ is not equal to $I_{LINE}$, but is equal to $I_{E1}-I_{B1}$ or $I_{LINE}-I_{B1}$.

An additional problem arises from $I_{B1}$ being outside the amplifier feedback path. Since $I_{C1}$ and $I_{B1}$ are related by the Beta of $Q_1$, and the Beta of a transistor is a function of the actual signal level, the error term introduced by not accounting for current $I_{B1}$ in the feedback loop is signal dependent. Signal dependent error terms are a source of harmonic distortion which is problematic for communication devices. In order for current 56 k modems (V.90 standard) to function, a signal to distortion ratio greater than 80 dB is needed. Unfortunately, due to the error term introduced by neglecting $I_{B1}$, the circuit of FIG. 4 can provide a signal to distortion ratio of only about 75 dB even when high quality components are utilized.

SUMMARY

The present invention proposes a novel method and apparatus for increasing the signal to distortion ratio in a line powered telephone line interface or data access arrangement (DAA). The present invention accomplishes this task by reducing the amount of error which is inherent to the prior art circuit design by adapting the circuit of FIG. 4 to incorporate more of the total line current supplied by the telephone company into the feedback circuit. The invention modifies the prior art circuit by inserting an additional sense resistor to sense the current that is flowing through the line modulator but not through the shunt regulator.

According to one aspect of the present invention, the prior art is improved upon by inserting an additional sense resistor in series with the emitter output of transistor $Q_2$, found within the line modulator. In the prior art circuit, the telephone line current $I_{LINE}$ enters the DAA through the emitter of transistor $Q_1$. The current that is allowed to flow through $Q_1$ results in a base current of $Q_1$, $I_{B1}$, and a collector current of $Q_1$, $I_{C1}$. The prior art only incorporates $I_{C1}$ into the feedback path of the amplifier, leaving $I_{B1}$ outside of the feedback path. Since transistor $Q_2$ is electrically connected to the base of $Q_1$, the current $I_{B1}$ flows through transistor $Q_2$. Therefore, the emitter of transistor $Q_2$ is the path for most of the total circuit current $I_{LINE}$ which is not flowing through the prior art sense resistor or equivalently the shunt regulator.

In accordance with this aspect of the present invention, by serially connecting an additional sense resistor to the emitter output of transistor $Q_2$ and including the current across the additional sense resistor, in addition to the current across the original sense resistor, in the feedback path, the amplifier can sense substantially all of $I_{LINE}$ within the circuit and process accordingly to remove noise and distortion. This arrangement results in an increase of the overall signal to distortion ratio in the circuit.

DETAILED DESCRIPTION OF THE INVENTION

A motivation of the present invention was to provide a line powered data access arrangement (DAA) device having improved signal to distortion ratio characteristics over the prior art. The present invention is particularly useful for modern telephone modems (V.90 standard) which require a signal to distortion ratio greater than 80 dB which is difficult to achieve in line powered DAAs of the prior art.

Figure 1:
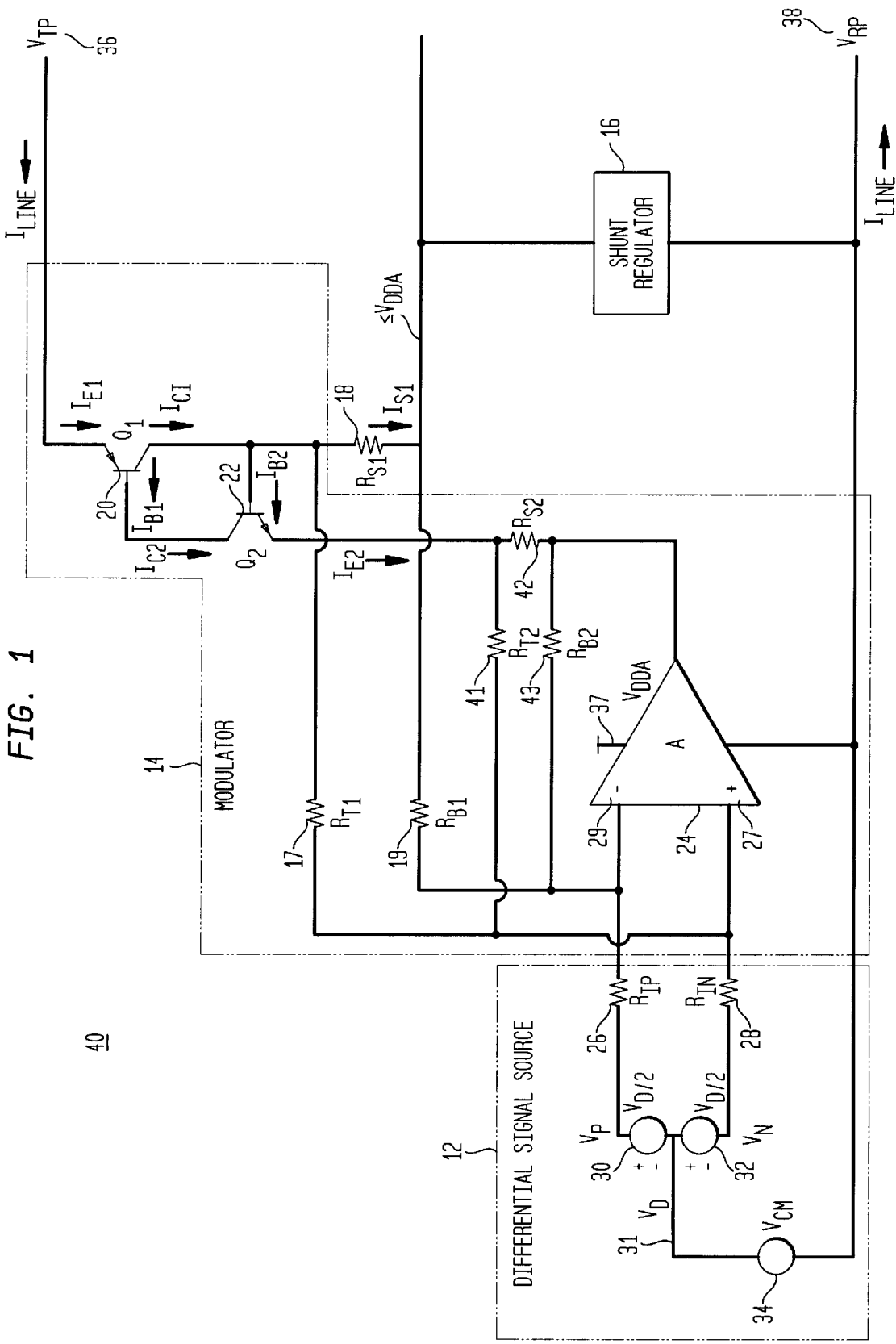
FIG. 1 is a circuit diagram of an embodiment of a low noise line powered DAA in accordance with the present invention.

FIG. 1 illustrates a telephone line interface 40 having a differential signal source 12, line modulator 14, shunt regulator 16, and a first sense resistor 18. The line modulator 14 includes a second sense resistor 42 that is used to reduce error in the telephone line interface 40 by accounting for substantially all line current that doesn't flow through the shunt regulator 14.

Referring to FIG. 1, which is a circuit diagram of a first preferred embodiment of the present invention, the differential signal source 12 functions by adding half of the desired signal voltage 31 to the common mode voltage 34 to create voltage level 30 and subtracting half of the signal voltage 31 from common mode voltage 34 to create voltage level 32. These differential signals 30 and 32 then drive the input resistors 26 and 28 to provide a differential signal input current into the amplifier 24 at the non-inverting input 27 and at the inverting input 29, respectively. The generation of the differential signal currents can be made by other means which are well known in the prior art, and thus will not be further discussed.

The shunt regulator 16 provides power drawn from the telephone line to the line modulator circuit 14 as well as to other modem and/or data processing circuitry necessary to provide a DC termination and AC modulation of the telephone line. The shunt regulator 16 limits the voltage across system components which are in parallel with the shunt regulator to voltage level $V_{DDA}$. The shunt regulator is especially important if the amplifier 24 and other circuitry is fabricated in low voltage CMOS technology that cannot withstand voltages above 5 volts (or other fabrication technologies with low voltage requirements). Since the voltage difference between the telephone line tip voltage 36 and the telephone line ring voltage 38 can range from 5 to 56 volts, the DAA could be destroyed in the absence of shunt regulator 16.

The sense resistor 18 is used in a feedback loop by the control amplifier 24 located within line modulator circuit 14. By monitoring the current through sense resistor 18 with a feedback loop, the amplifier 24 can compensate for distortion in the DAA. Resistors 17 and 19 sense the differential voltage across sense resistor 18. By setting the resistance of resistor 17 equal to the resistance of resistor 19, the current through resistors 17 and 19 will accurately model the current through resistor 18. The resistance of resistors 17 and 19 is several hundred thousand ohms, while the resistance of the sense resistor 18 is approximately 10–20 ohms. Because of the relatively large resistance of resistor 17 and 19, the current through these resistors can be neglected in the circuit analysis. Ignoring the currents through resistors 17 and 19, the current through resistor 18 is equal to the current through the shunt regulator 16 which is connected in series with sense resistor 18.

Figure 4:
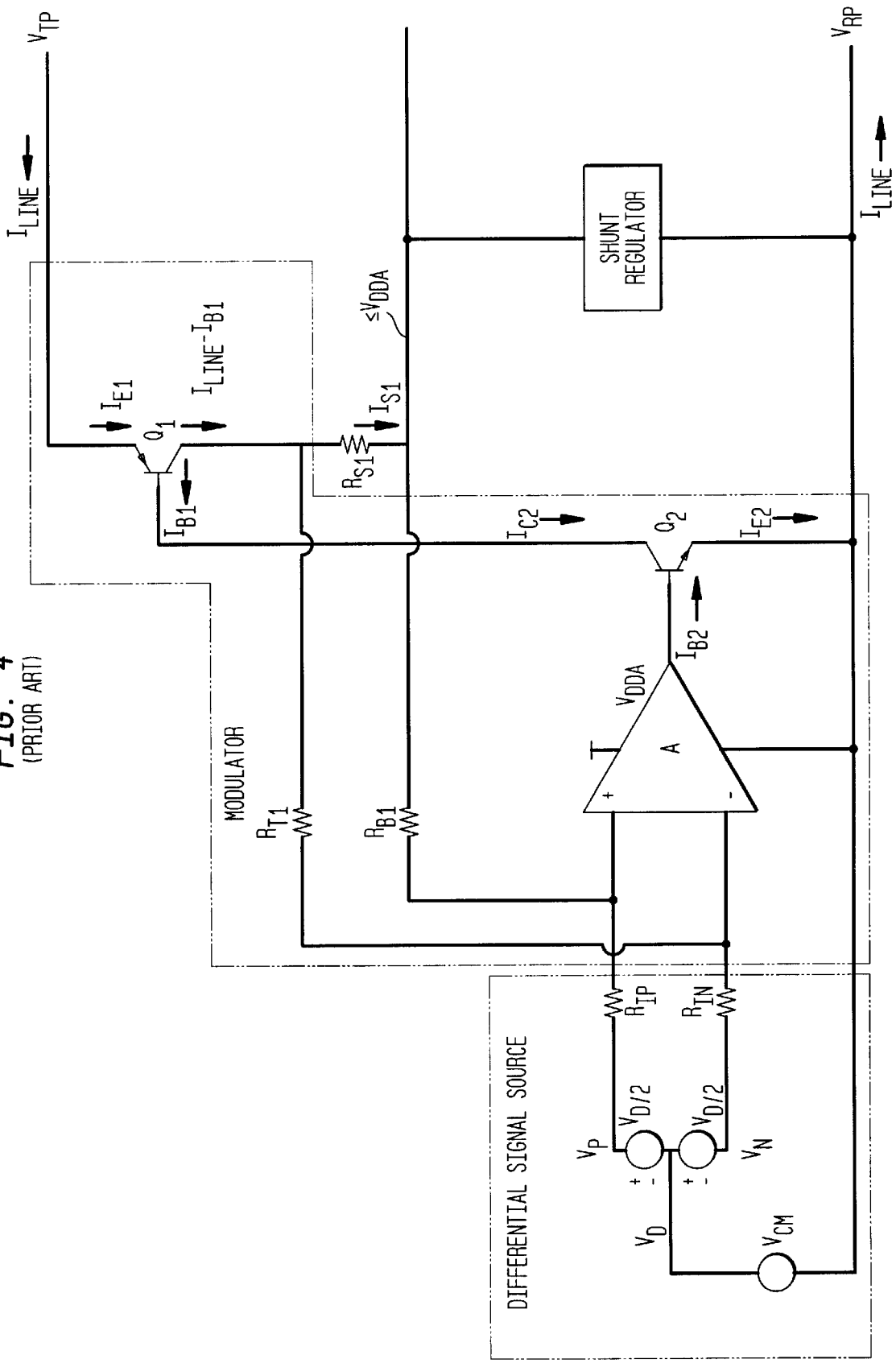
FIG. 4 is a circuit diagram of a data access arrangement (DAA) in accordance with the prior art.

The present invention is directed at incorporating the stray currents which do not flow through the shunt regulator 16, and therefore are not sensed through sense resistor 18 in the prior art circuit of FIG. 4. In the two embodiments set forth below and depicted in FIGS. 1 and 2, an additional sense resistor 42 is serially connected to the emitter of transistor 22. The current through sense resistor 42 is then incorporated in the feedback loop of control amplifier 24 located within line modulator circuit 14. The purpose of the additional sense resistor 42 is to sense the DAA current which flows through the modulation circuitry 14 which would otherwise be outside the shunt regulator 16 current path. Resistors 41 and 43 sense the differential voltage across sense resistor 42. By setting resistor 41 equal to resistor 43, the current through resistors 41 and 43 will accurately model the current through resistor 42. The resistance of resistors 41 and 43 is several hundred thousand ohms, and the resistance of the sense resistor 42 is approximately 10–20 ohms. Because of the relatively large resistance of resistor 41 and 43, the current through these resistors can be neglected in the circuit analysis. Ignoring the currents through resistors 41 and 43, the current through resistor 42 is equal to the current flowing through the emitter of transistor 22 which is serially connected to sense resistor 42.

By incorporating the current through both sense resistor 18 and sense resistor 42, the circuit can incorporate more of the total DAA current in the feedback loop of control amplifier 24 and thereby reduce the harmonic distortion in the DAA. The control amplifier 24 senses the current through sense resistors 18 and 42 with a feedback loop and attempts to control the circuit in the following manner. Resistors 17 and 19 sense the differential voltage across sense resistor 18, and resistors 41 and 43 sense the differential voltage across resistor sense 42. By setting resistor 17 equal to resistor 19 and setting resistor 41 equal to resistor 43, and setting the ratio of resistor 18 to resistor 17 equal to the ratio of resistor 42 to resistor 41, the sum of the currents through resistors 17 and 41 into the non-inverting input 27 of control amplifier 24 and the sum of the currents through resistors 19 and 43 into the inverting input 29 of control amplifier 24 will accurately model the sum of currents through sense resistor 18 and 42. This sum approximately models $I_{LINE}$ and is the parameter to be controlled. The feedback action of the loop comprising amplifier 24, transistor 22, and transistor 20 adjusts the current through resistors 18 and 42 such that the sum of the currents through resistors 17 and 41 equal the current from the differential signal source 12 through resistor 28, and the sum of the currents through resistors 19 and 43 equal the current from the differential signal source 12 through resistor 26.

In one embodiment of the invention as depicted in FIG. 1, the output of amplifier 24 is electrically connected to the emitter of transistor 22 through an additional sense resistor 42, the collector of transistor 22 is electrically connected to the base of transistor 20, and the base of transistor 22 is electrically connected to the emitter of transistor 20. In this configuration, the original sense resistor current $I_{S1}$ through the primary sense resistor 18 is equal to the transistor 20 collector current $I_{C1}$ less the transistor 22 base current $I_{B2}$. Accordingly, the transistor 22 base current $I_{B2}$ equals the transistor 20 collector current $I_{C1}$ less the original sense resistor current $I_{S1}$. The current through the additional sense resistor 42 is the transistor 22 emitter current $I_{E2}$, or equivalently the sum of the transistor 22 base current $I_{B2}$ and collector current $I_{C2}$. Since the transistor 22 collector current $I_{C2}$ equals the transistor 20 base current $I_{B1}$, the current through the additional sense resistor 42 can also be said to be the sum of the currents $I_{B1}$ and $I_{B2}$. Therefore, the sum of the currents through both sense resistors 18 and 42 equals $(I_{B1}+I_{B2}+I_{C1}-I_{B2})$, or equivalently $I_{B1}+I_{C1}$, which equals $I_{LINE}$. This arrangement results in a circuit which is virtually free from distortion. The circuit is free from distortion because the first sense resistor 18 senses the current and its associated distortion through the shunt regulator, and the second sense resistor 42 senses all other significant currents and their associated distortion, allowing the amplifier to control $I_{LINE}$ by incorporating all of $I_{LINE}$ in a feedback path.

Figure 2:
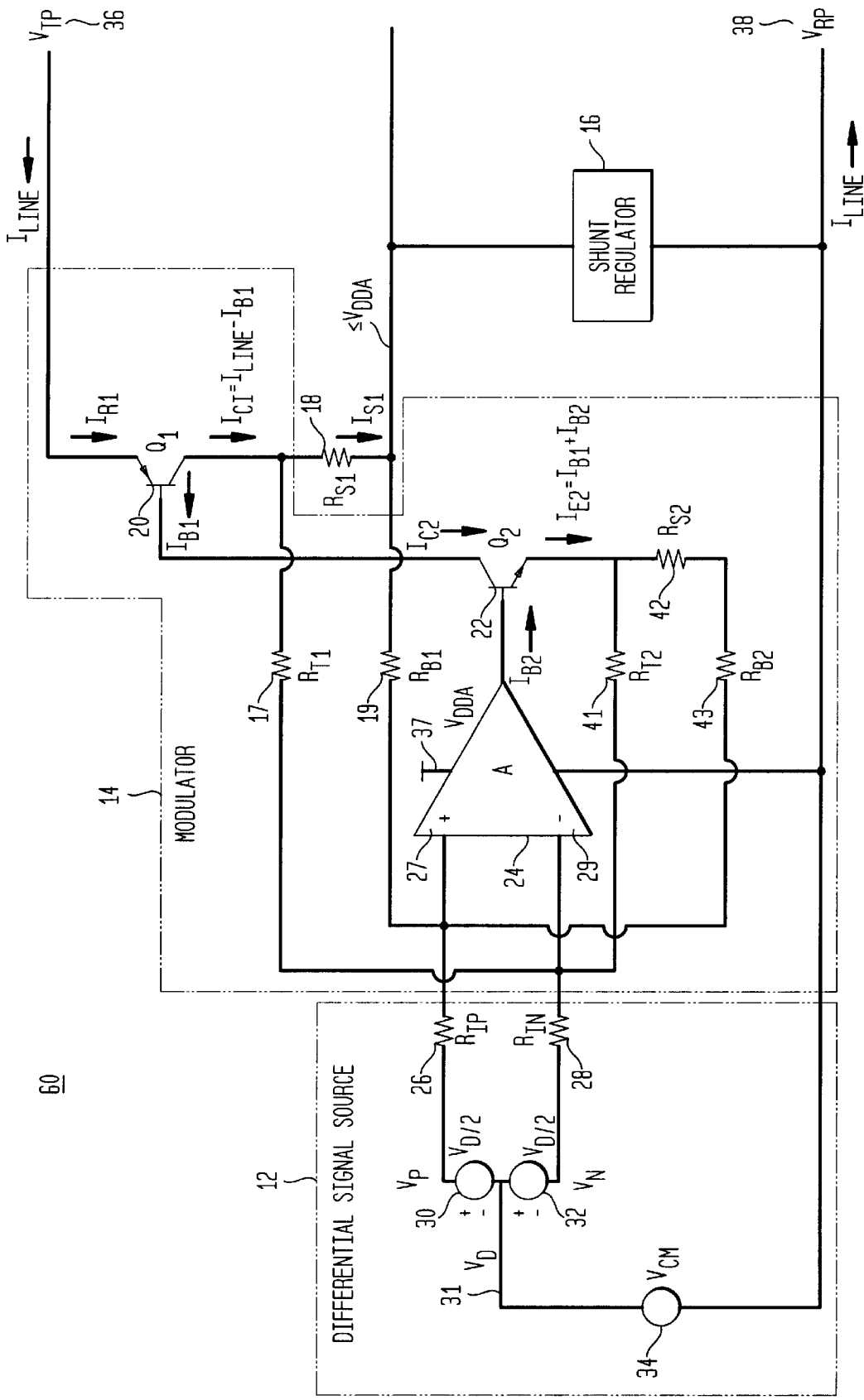
FIG. 2 is a circuit diagram of a second embodiment of a low noise line powered DAA in accordance with the present invention.
Figure 3:
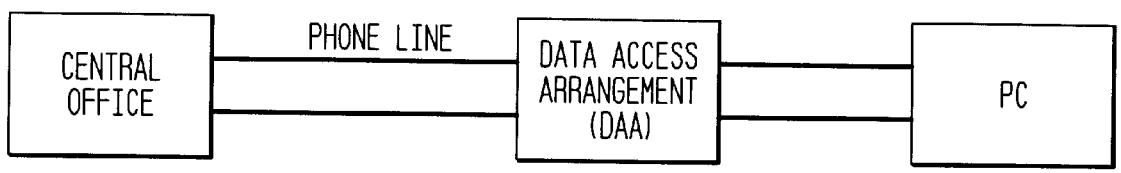
FIG. 3 is a block diagram of a conventional interface between a telephone network and an electric main powered device in accordance with the prior art.

In another embodiment of the invention as depicted in FIG. 2, the amplifier 24 controls the base of transistor 22, while the collector of transistor 22 is used to control the base of transistor 20. In this configuration, the transistor 20 base current $I_{B1}$ is the transistor 22 collector current $I_{C2}$. The emitter current $I_{E2}$ of transistor 22, which is the current path containing the additional sense resistor 42, is composed of transistor 22 base current $I_{B2}$ and transistor 22 collector current $I_{C2}$. The amplifier 24 supplies the transistor 22 base current $I_{B2}$ and the transistor 22 collector current $I_{C2}$ supplied by transistor 20 base current $I_{B1}$. Since the feedback path includes the current $I_{C1}$ across the original sense resistor 18, and the current $I_{E2}$, or equivalently $I_{B1}+I_{B2}$, across the additional sense resistor 42, the current in the feedback path equals $I_{C1}+I_{B1}+I_{B2}$. Therefore, the current in the feedback path equals $I_{LINE}+I_{B2}$ with the new error term being $I_{B2}$. Although there is still a degree of error in the system, the error is reduced from $I_{B1}$ to $I_{B2}$. The difference in magnitude between $I_{B1}$ and $I_{B2}$ is the Beta of transistor 22 (Beta is typically greater than 50). Even though this arrangement still contains a small amount of error, it produces a signal to distortion ratio suitable for present communication devices (>80 dB). It also requires less power from the amplifier 24 compared to the embodiment of FIG. 1 since the amplifier 24 controls transistor 22 through the base rather than the emitter.

Conclusion

Accordingly, the present invention provides a superior low noise DAA that is particularly useful for modern modems which require a high signal to distortion ratio. By significantly reducing the amount of distortion in the DAA, the present invention allows transistor 20 and 22 to be specified based on breakdown voltage, with minimal beta requirements. Reducing the need for transistors with very specific beta requirements allows for the use of less expensive components to achieve overall cost reduction.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A telephone line interface circuit for placing an information signal on a telephone line comprising:
   a line modulator for receiving an information signal, said line modulator coupled to said telephone line for modulating said telephone line with said information signal;
   a first sense resistor coupled to said line modulator so as to sense a current through said line modulator;
   a second sense resistor electrically connected within said line modulator for sensing an error current introduced by said line modulator,
   a first feedback path from said first sense resistor to said line modulator; and
   a second feedback path containing said second sense resistor;
   such that said line modulator incorporates said current through said first sense resistor, said current through said second sense resistor, and said information signal.

2. A telephone line interface circuit as set forth in claim 1 further comprising a shunt regulator coupled in series with said first sense resistor on said telephone line.

3. A telephone line interface circuit as set forth in claim 2 wherein said line modulator comprises a first transistor.

4. A telephone line interface circuit as set forth in claim 3 wherein said line modulator further comprises an amplifier having an output coupled to a control terminal of said first transistor so as to control the current flowing through current flow terminals of said first transistor, said amplifier being coupled to receive at inputs thereto said current through said first sense resistor, said current through said second sense resistor and said information signal.

5. A telephone line interface circuit as set forth in claim 4 wherein said line modulator comprises a second transistor coupled between said output terminal of said amplifier and said control terminal of said first transistor such that said current flowing through said current flow terminals of said first transistor is controlled as a function of said current through said first sense resistor, said current through said second sense resistor and said information signal.

6. A telephone line interface circuit as set forth in claim 4 wherein a first of said current flow terminals of said first transistor is coupled with said first sense resistor and a second of said current flow terminals is coupled with said telephone line.

7. A telephone line interface circuit as set forth in claim 6 wherein said line modulator further comprises a second transistor having a collector coupled to said control terminal of said first transistor, an emitter coupled to said output terminal of said amplifier through said second sense resistor and a base terminal coupled between said first transistor and said first sense resistor.

8. A telephone line interface circuit as set forth in claim 6 wherein said line modulator further comprises a second transistor having a control terminal coupled to said output terminal of said amplifier, a collector coupled to said control terminal of said first transistor and an emitter coupled to said second sense resistor.

9. A telephone line interface circuit for placing an information signal on a telephone line comprising:

a shunt regulator;

a first sense resistor in series with said shunt regulator for sensing a current through said shunt regulator;

a line modulator electrically connected to said first sense resistor and said shunt regulator;

a second sense resistor electrically connected within said line modulator for sensing a current from the telephone line within said line modulator;

a first feedback path from said first sense resistor to said line modulator; and a second feedback path to said modulator through said second sense resistor located within said modulator.

10. The telephone line interface according to claim 9, wherein:

said line modulator comprises a bipolar transistor.

11. The telephone line interface according to claim 10, wherein:

said bipolar transistor comprises a pnp bipolar transistor.

12. The telephone line interface according to claim 9, wherein:

said telephone line interface is a data access arrangement for a modem.

13. A telephone line interface circuit for placing an information signal on a telephone line comprising:

a first sense resistor for sensing a current on said telephone line;

a first transistor in series with said first sense resistor;

a second sense resistor coupled to sense the current on said telephone line outside of the current path of said first sense resistor;

a second transistor coupled between said second sense resistor and the base of said first transistor;

an amplifier having an input for accepting an information signal and an output electrically connected to said second transistor for modulating said telephone line with said information signal;

a first feedback path from said first sense resistor to said amplifier; and a second feedback path from said second sense resistor to said amplifier.

14. The telephone line interface circuit according to claim 13, wherein;

said first and second transistors are bipolar transistors.

15. The telephone line interface circuit according to claim 14, wherein;

said first transistor is a pnp bipolar transistor; and said second transistor is a npn bipolar transistor.

16. The telephone line interface circuit according to claim 15, wherein;

said amplifier controls the emitter of said second transistor; and said second transistor controls the base of said first transistor through the collector of said second transistor;

such that said amplifier controls said first transistor.

17. The telephone line interface circuit according to claim 16, wherein;

said second sense resistor is connected between said output of said amplifier and the emitter of said second transistor; and the base of said second transistor is connected to the collector of said first transistor.

18. The telephone line interface circuit according to claim 15, wherein;

said amplifier controls the base of said second transistor; and said second transistor controls the base of said first transistor through the collector of said second transistor;

such that said amplifier controls said first transistor.

19. A method for placing an information signal on a telephone line, said method comprising:

modulating said telephone line with a modulator;

sensing a first current passing through said modulator;

sensing a second current within said modulator; and feeding back said first and second currents to said modulator.

20. A telephone line interface circuit for placing an information signal on a telephone line, comprising:

means for drawing power from a telephone line;

means for modulating said telephone line with an information signal, said means for modulating being in series with said means for drawing power;

first means for sensing an amount of distortion in said telephone line interface circuit, said first means for sensing being connected in series with said means for drawing power and said means for modulating;

second means for sensing an amount of distortion in said telephone line interface circuit, said second means for sensing being connected within said means for modulating; and means for feeding back said first sensed amount of distortion and said second sensed amount of distortion to said telephone line interface circuit.

21. A telephone line interface circuit for placing an information signal on a telephone line comprising:

a line modulator for receiving an information signal, said line modulator coupled to said telephone line for modulating said telephone line with said information signal;

a first sense resistor coupled to said line modulator so as to sense a current through said line modulator; and a second sense resistor electrically connected within said line modulator for sensing an error current introduced by said line modulator;

such that said line modulator incorporates said current through said first sense resistor, said current through said second sense resistor, and said information signal.

* * * * *